(12) United States Patent
Allen

(10) Patent No.: US 6,534,306 B1
(45) Date of Patent: Mar. 18, 2003

(54) MODULAR BIOFILTER UNIT AND METHOD OF USE

(75) Inventor: Jan Allen, Shoreline, WA (US)

(73) Assignee: CH2M Hill, Inc., Englewood, CO (US)

( * ) Notice: Subject to any disclaimer, the term of this patent is extended or adjusted under 35 U.S.C. 154(b) by 162 days.

(21) Appl. No.: 09/709,837

(22) Filed: Nov. 9, 2000

Related U.S. Application Data

(60) Provisional application No. 60/205,039, filed on May 18, 2000.

(51) Int. Cl.[7] .......................... B01D 53/85; C12S 5/00; C12M 1/16
(52) U.S. Cl. ................. 435/266; 435/290.1; 435/299.1; 435/300.1
(58) Field of Search ............................ 435/266, 299.1, 435/290.1, 290.4, 300.1

(56) References Cited

U.S. PATENT DOCUMENTS

| | | | |
|---|---|---|---|
| 5,635,394 A | 6/1997 | Horn | |
| 5,738,713 A | * 4/1998 | Firth | ............................ 96/131 |
| 5,869,323 A | 2/1999 | Horn | |
| 5,891,711 A | 4/1999 | Carter | |
| 6,099,613 A | * 8/2000 | Allen et al. | ............... 435/290.1 |
| 6,281,001 B1 | 8/2001 | McNelly | |

FOREIGN PATENT DOCUMENTS

| | | | |
|---|---|---|---|
| DE | 4322617 A1 | * | 1/1995 |
| DE | 4324714 A1 | * | 1/1995 |
| GB | 2336361 A | * | 10/1999 |
| WO | WO 00/26337 | | 5/2000 |
| WO | WO 02/24860 | | 3/2002 |

OTHER PUBLICATIONS

Biocube, Inc., Biocube Odor Control Systems, "The Natural Solution to Odor Control", http://www.trgbiofilter.com, visted Oct. 12, 2000, 6 pages.

TRG Biofilter, "Turnkey Biofiltration Systems and Services To Comply with Increasingly Stringent Air Pollution Regulations", http://www.trgbiofilter.com, visited Oct. 12, 2000, 6 pages.

TRG Biofilter, "Standard Systems", http://www.trgbiofilter.com, visited Oct. 17, 2000, 3 pages.

* cited by examiner

Primary Examiner—William H. Beisner
(74) Attorney, Agent, or Firm—Swanson & Bratschun LLC

(57) ABSTRACT

A biofilter apparatus includes at least one container having a height, length, and width containing a deep, low density, porous media within the container. An airflow apparatus is constructed and arranged to deliver a flow of air to be treated to the filter media. The airflow apparatus provides at least 37.5 cfm/ft$^2$ with the porous media creating a backpressure of not more than about 10 inches of water. The media preferably consists of about 30–40% shredded tree bark particles, about 30–40% shredded wood, and about 30–40% composted wood sized such that 95% of the media will pass through a three inch screen and be retained by a 0.5 inch screen. A fluid mister may be provided in fluid communication with the flow of the air to be treated for introducing humidity to the air. The method for treating air via biofiltration utilizes the biofiltration apparatus discussed above and includes directing contaminated air into the container through the airflow apparatus and through the media at at least 37.5 cfm/ft$^2$ with the porous media creating a backpressure of not more than about 10 inches of water. The method further includes delivering a water mist to the inlet piping for introducing humidity to the air.

17 Claims, 2 Drawing Sheets

MODULAR BIOFILTER UNIT AND METHOD OF USE

CROSS REFERENCE TO RELATED APPLICATION

This application claims priority to U.S. Provisional Application No. 60/205,039, filed May 18, 2000, entitled "Modular Biofilter Unit."

BACKGROUND ART

Biofilters have found industrial applications in a large number of industrial facilities creating noxious odors or volatile organic compounds. Such industries include food processing, paint manufacturing, waste processing, chemical manufacturing, printing, film production, yeast production, poultry processing, hog processing, composting, oilseed processing, solvent users, wood processing, and many others. Biofiltration relies upon a film of microorganisms, commonly referred to as a biofilm, which converts odorous and volatile organic compounds into cell mass, energy, carbon dioxide and water. Biofilters have media upon which the biofilm resides. As airflow moves through the media, the subject compounds or pollutants impinge upon the wet film surfaces surrounding each media particle. This then becomes the feeding or decomposition site for the adsorbed compounds. That is, the microorganisms feed off the adsorbed compounds at these sites. On a micro scale, the mechanism involved in biofiltration is adsorption followed by biological decomposition.

Owing to the heartiness of the microorganisms, biofilters are remarkably robust in their ability to remove pollutants and odors across a wide range of compounds and concentrations. Virtually any biodegradable compound can be removed from an airflow using biofiltration.

Biofiltration differs from carbon adsorption in that the biofilter does not accumulate pollutants and then decline in effectiveness, eventually requiring replacement of the carbon media. The contaminated carbon also must be disposed of in an appropriate fashion. Also, activated carbon is not equally effective for removal of all types of pollutants. Biofiltration is also unlike thermal destruction in that it operates at ambient temperatures, usually requiring no external heat source. Thus, not only does it eliminate a potential source of air pollution, it is also able to function with much less energy input. Biofiltration is unlike wet scrubbers in that no chemicals are required.

Some of the key features of biofilters include low operating cost, no moving parts, robust due to the fact that it is a living system. It is not uncommon to have no chemical requirements, no noise, no dust, no mist, virtually no residual odor, minimal or no corrosion and only periodic maintenance of the active media is required.

Prior art biofiltration systems have drawbacks, however. They typically require a large footprint and they typically provide for low air throughput. Additionally, compaction of the filter media is associated with reduced efficiency due to the channeling of the contaminated airstream around the compacted media, rather than being porous to it. Generally, filter media are of a relatively shallow depth to avoid compaction, about one to four feet or so. Certain prior art biofilters have attempted to overcome these disadvantages, with limited success. Generally, an improvement in one parameter prohibits an improvement in another, or requires additional modifications in order to operate. For example, a relatively high flow rate of 7,500 cfm was achieved in one biofilter, but resulted in a backpressure of 14–15 inches of water. This system utilized only about 21.25 cubic yards of filter media per tank, and the airstream was distributed amongst four separate tanks through a complicated piping system. See Horn, U.S. Pat. No. 5,635,394. In other cases, compaction of filter media is avoided by having multiple media layers sufficiently thin. Layering of media requires corresponding supporting structures and a means to provide for airflow through the supports. See, e.g., Carter, U.S. Pat. No. 5,891,711. In the Carter system, five layers of filter media with a height of one foot each and a total volume of 100 cubic feet (about 3.7 cubic yards) is operated with air flowing at only 200 cfm.

Many conventional prior art biofilters use spray towers to deliver needed moisture to the filter media. Spray towers have a very high water usage, requiring about 50–300 gallons per minute at a 30–100 psi pressure to deliver suitable humidity to the system. Spray towers also contribute to a large footprint. Thus, spray towers, due to their high water usage, have high operating costs, create waste treatment problems and wasted space, which increases capital costs.

Other prior art biofilters provide needed moisture by forcing contaminated air through a water reservoir prior to introduction to the media. See Carter, supra. This system has the disadvantage of additional structures and piping, and also requires manipulation of the airstream for proper humidification, for example, by forcing the air through a fine grate to generate the required diffusion of air into fine bubbles. Variations on this theme include forcing air upward through a packing material, while water flows downward over the packing material in order to humidify the air prior to introduction to the filter media. In some cases, this process occurs in the filter media itself, requiring sprayers as described above.

Accordingly, there remains a need for a biofilter apparatus that is capable of high airflow rates with relatively low backpressure of a large volumes of filter media, while having a small footprint, and with a simple and efficient humidification procedure.

SUMMARY OF THE INVENTION

In summary, the present invention consists of a biofilter apparatus having at least one container, a deep, low water flow rate, porous media that minimizes energy requirements to circulate contaminated air through the system and allows for treatment of much greater volumes of air per square foot of filtered media, and an air flow apparatus constructed and arranged to support operation with relatively high airflows and low backpressure. The present invention also consists of a biofilter arrangement that contains a unique air humidification system that allows for humidification of the introduced air using a compact misting system operating under relatively high pressure and low density. The use of the misting further minimizes capital costs by eliminating the need for a spray tower, which is typically used in prior art systems to humidify the airflow. The biofilter arrangements of the present invention allow for biofilters to be stacked six high or more, maximizing utilization of potentially valuable ground space. Capital costs are further reduced by allowing for lower power and therefore less expensive fans to drive air through the system. The present invention also includes methods for utilizing the biofilter arrangements.

DETAILED DESCRIPTION OF THE PREFERRED EMBODIMENT

Figure 1:
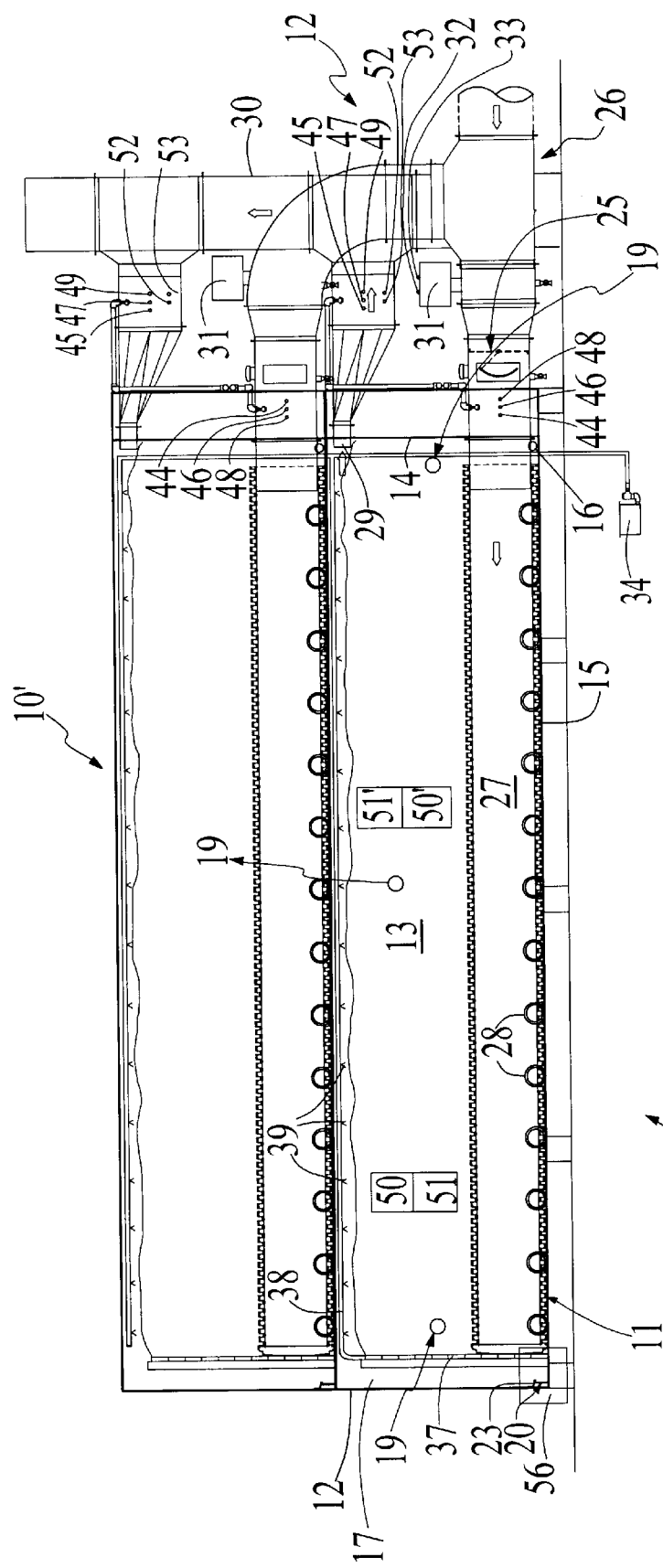
FIG. 1 is an elevational view of the biofilter apparatus according to the present invention with the side wall of the housing removed.

Referring to FIG. 1 modular biofiltration unit 10 includes a housing 11, an air flow apparatus 12, and a filter media 13. The housing 11 is a standard 40-foot long ISO shipping container. The dimensions of the shipping container are approximately 40 feet long by 8 feet wide by 8 feet 6 inches tall. Preferably the container is one configured for refrigeration, which includes a stainless steel liner and bulkhead 14 at the front end and a slotted aluminum floor 15 with drainage channels in corner drain holes 16 near the bulkhead 14. At the back end are doors 17. International forty-foot shipping containers are typically designed for stacking nine high on the ship, fully loaded. They are typically rated for a gross weight between 67,000–72,000 pounds, with a tare weight between 8,000 and 12,000 pounds. Domestic containers are typically designed to stack six high. The overall capacity of the 40-foot container is 78 cubic yards, after allowance for air pressure are made.

The biofiltration unit 10 of FIG. 1 includes a bottom container or housing 11 and top housing container, 11' that are substantially identical. Up to nine containers could be stacked in accordance with the preferred embodiment, but only two are shown for simplicity in FIG. 1. Each container 11, 11' is reinforced at its four cornes for structural support, and the bottom container is secured with angle stops to prevent any lateral movement. The container 11 sits on a concrete foundation pad (not shown) at the two ends of the container. The containers 11, 11' should be appropriately sloped for internal drainage by blocking and shimming under the cornes and intermediate points. Corne shims (not shown) are of stainless steel and suitable for 81 tons per corne point. Stacked containers would be secured together using standard "inter box connectors" (not shown). It is preferable to have roof hatches 18 on the container for access (see FIG. 2). Three hatches are preferred. These hatches must be recessed to allow the containers to be stacked. It is advantageous to have inspection and sampling ports 19 throughout the container. There are three such ports on each long wall; one at the top center, and one at approximately twelve feet from each end wall approximately four feet above the floor. They are about eight inches in diameter and made of schedule 80 PVC.

Figure 4:
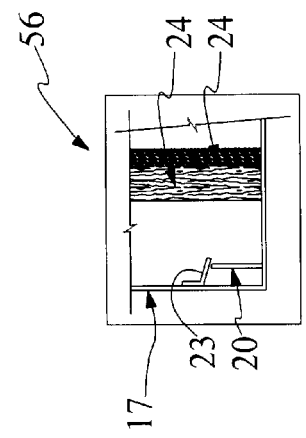
FIG. 4 is an enlarged view of the portion of the container indicated in FIG. 1

Other appropriate modifications to a standard ISO shipping container in the preferred embodiment are as follows. There are two six-inch high water-tight dams 20 welded at the two ends of the floor surface 15 to prevent condensate from leaking out of door 17, and to collect condensate to a gravity drain 21 at the opposite end 22 (see FIG. 3). Referring to FIG. 4, the doors of the container are fitted with drip lips 23 to divert condensation onto the wet side of the water dam near the door. A system of treated timber stops and bulkhead boards 24 are installed inside the doors 17 to allow the doors to be opened without any loss or movement of the media. These are fastened with stainless steel hardware and fasteners (not shown). A longitudinal waler, or stiffener (not shown) is installed along each side of the housing as protection against sidewall deflection due to elevated density and internal pressure of the media in its saturated state.

The air flow apparatus 12 has components internal to and external to the housing 11. A valve damper 25 is located between an inlet piping 26 and the container to regulate air flow into the container. The valve damper 25 is preferably a wafer style butterfly valve with a stainless steel stem and EPDM seat, or a fabricated stainless steel butterfly damper. If a fabricated butterfly damper is used it must be constructed to prevent air and condensate leakage at the pipe penetrations of the axle or pivot shaft. It has an adjustable set bolt and position indicator on the pipe exterior (not shown). The damper is fitted on the interior with a stop and gasket all around to prevent backflow of air during idle or intermittent periods of operation. Ideally, all parts are removable and replaceable in the field.

A thirty inch diameter corrugated polyethylene manifold 27 is connected at the front end of the container 11 to inlet piping 26. A plurality of lateral plenums 28 are equally spaced along the length of the housing 11 along the floor of the housing and extend from side to side within the housing. These lateral plenums 28 are made of eight-inch polyethylene pipe that is perforated to allow for the flow of air therethrough. An outlet manifold 29 located at the top and front of the bulkhead 14 is preferably a plenum about 8 by 96 inches to allow for ample flow of air therethrough. This outlet manifold 29 is connected to an exhaust stack 30.

The interior of the housing 11 is filled with a filter media 13 to a depth sufficient to leave about a one foot, and preferably not less than an eight-inch head space above the media. The media volume is approximately 68–80 cubic yards. The media is preferably a combination of between 30–40% shredded tree bark particles, 30–40% shredded wood (e.g., stumps, waste lumber and the like) and 30–40% composted wood. The media preferably has a particle size such that 95% of the media will pass a three-inch screen and be retained by a 0.5-inch screen. The media used with the preferred embodiment is therefore of a low density, (e.g., approximately 7.5 to 8 feet deep) and porous. The media therefore allows for relatively high throughputs of air to be treated at relatively low backpressures. For example, at 12,000 cubic feet per minute of flow through in the system, the backpressure is about 10 inches of water. At 6,000 cubic feet per minute, the backpressure is about three inches of water. At 2,000 cubic feet per minute, the backpressure is about 1.7 inches of water. In embodiments utilizing a plurality of stacked housings, a lightweight component will be added to the media formulation to insure the gross weight rating of each housing is not exceeded. This component may be expanded polyethylene foam or expanded polystyrene foam. The media is impregnated with conventional biofilter microorganisms. The microorganisms are a diverse spectrum of indigenous bacteria and fungi as is typically used in biofiltration systems and is commonly known by those skilled in the art.

Drainage and moisture control are critical items for this design. The system preferably includes a mister 31 for introducing humidity to the air to be treated flowing into the biofilter housing. The mister system of the present invention replaces spray towers that are commonly used and injects a water mist into the housing. Because the system relies upon microorganisms to digest the pollutants, maintenance of high levels of humidity within the biofilter are critical to proper operation. A suitable misting system would be Piian high pressure nozzle assemblies available from Piian Corporation, or equivalent. In the preferred embodiment, three such assemblies with a total of eighteen nozzles are used. The mister 31, in a preferred embodiment, is capable of delivering one gallon per minute of humidity at an 800-psi delivery pressure. An alternative embodiment delivering approximately two gallons per minute at 1500 psi is also acceptable. A hand-off-auto switch 32 and green running light 33 are mounted on the misting system pump. Optionally, the water used in the misting system can by pre-conditioned by a suitable filter system.

Leakage on the ground is not an acceptable situation for users of biofilters. Exposed manifold piping, e.g. 26, should be welded stainless steel to prevent leaking. Since manifold piping may be installed on site, prefabricated piping should be of pressed and rolled stainless steel, with continuous welded seam between pipe and flange on the inside and skip welded seam on the outside. To prevent leaking, gaskets should be neoprene, rated for sewage and 180° F., or continuously caulked with an appropriate sealant. The interior seam between the stainless steel wall skin and the aluminum floor is coated with a thick (typically 40 mil dry), elastic (about 300% elongation) sealant, to prevent condensate and water from passing through this joint. All interior seams in the stainless steel lining are also coated in the same manner. A drain 21 is mounted at the bulkhead 14.

Figure 3:
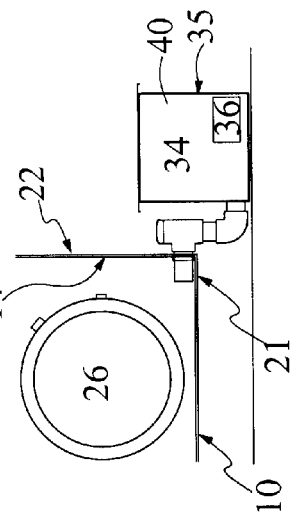
FIG. 3 is an elevational schematic view of part of the condensate recirculation system of the biofilter arrangement according to the present invention.

Because the units operate at saturated conditions there will nearly always be condensation the interior surfaces of the container. FIG. 1 and FIG. 3 illustrate the condensation recirculation system. A condensate collection chamber 34 is external to the container, and will collect gravity drainage from the biofilter, and contains connections for drains from each module, pump discharge, vent, and other necessary connections, including a frame 35 to secure the transfer pump 36 through a direct pipe connection. A mercury float switch (not shown) can activate the transfer pump. Preferably, the condensate collection chamber will have a minimum capacity of fifty gallons in the bottom thirty inches of water depth. A conduit 37 connects to a condensate recirculation system 38 that delivers water to the top of the media via sprayers 39. Overflow from the collection chamber 34 is suitably disposed of through overflow 40.

Preferably, the container 11 will be equipped with an electrical control panel 41 which has digital displays 42 relaying signals from sensors coupled to the control panel through connector 43. The sensors include inlet pressure 44, outlet pressure 45, inlet temperature 46, outlet temperature 47, inlet flow rate 48, outlet flow rate 49, media moisture at at least one location 50, 50', media temperature at at least one location 51, 51', nonresettable misting system hour meter 52, resettable misting system hour meter 53, and an ammeter for the booster fan (not shown). A suitable booster fan is rated for 11,000 cfm at 10 inches static water column and 7,500 cfm at 20 inches static water column. The control panel 41 will preferably be mounted on a freestanding stand with twenty feet of weatherproof wiring 54 inside the connector 43 between it and the biofilter module.

Further, it is preferable that a datalogger 55 be present to record and download the measurements displayed on this panel. This datalogger shall be provided with software necessary to download to a laptop computer, and a modem to download to a remote computer. All sensors should be voltage and signal compatible with the power supply, displays, and datalogger.

Figure 2:
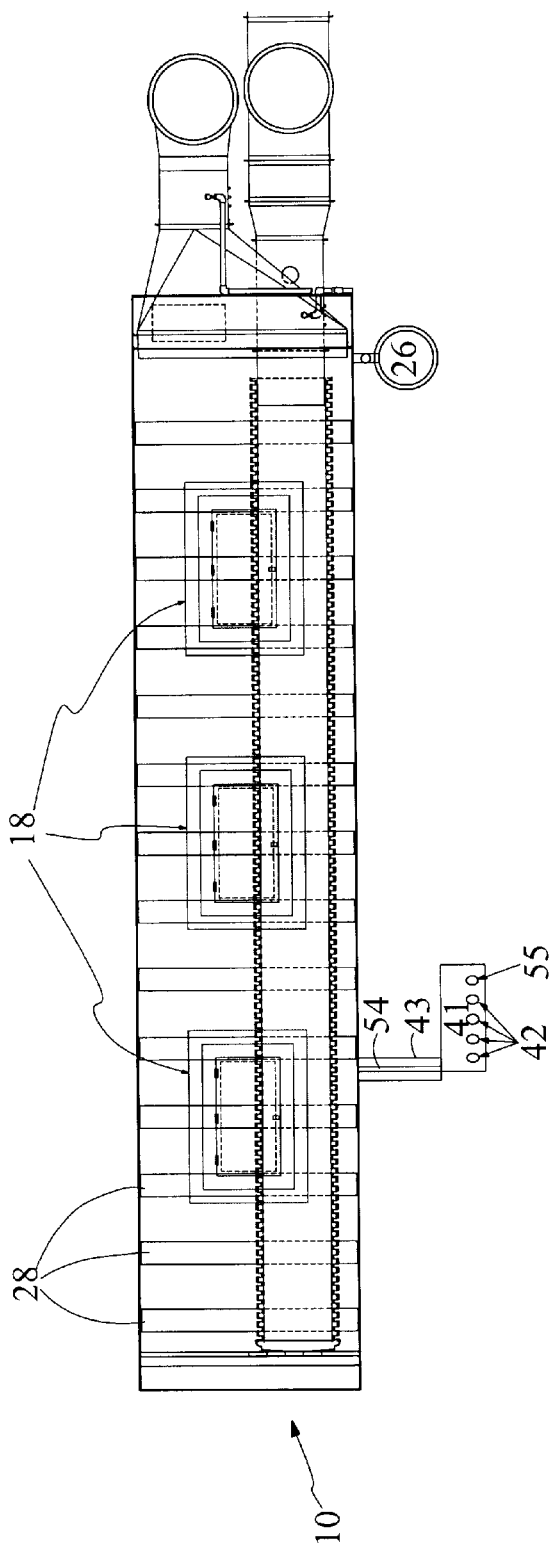
FIG. 2 is a plan view of the biofilter apparatus according to the present invention.

The modular biofilter of the present invention minimizes ground usage by providing an unconventionally deep, porous and low density filter media that enables high through-put of air to be treated. Use of the misting system described herein minimizes footprint requirements by eliminating the scrubbing tower. The porosity of the filter media allows for extremely large volumes of air to be treated per square foot of footprint. This advantage can be multiplied many times by stacking the modular units utilizing a stackable housing such as the ISO shipping container described above. The deep (approximately 8 ½ foot) shipping containers provide a convenient structure for containing the deep media bed. These and other advantages result from the unique combination of elements into the novel biofiltration unit described above. Arrangements using some or all of the advantageous principles of the present invention may be applied in a wide variety of specific systems. The biofilter arrangement of FIGS. 1 and 2 is typical and illustrative, and not to be regarded as limiting the scope of the invention or manner in which it may be practiced.

What is claimed is:

1. A biofilter apparatus for air treatment, said apparatus comprising:
   at least one container having a height, length, and width;
   a porous media within the container having a select range of particle size and a depth of at least 7.5 feet; and
   an air flow apparatus constructed and arranged to deliver a flow of air to be treated to the porous media, the air flow apparatus providing an airflow of at least 37.5 cfm/ft$^2$ with the select range of particle size of the porous media creating a backpressure of not more than about 10 inches of water.

2. The biofilter of claim 1, wherein the air flow apparatus comprises
   an inlet piping in fluid communication with a source of air to be treated;
   a supply manifold which extends the length of the container connected to the inlet piping;
   a plurality of lateral plenums situated on a floor of the container and extending widthwise within the container, said plenums being perforated to allow for the flow of air therethrough; and
   an outlet manifold spaced from and in fluid communication with the plurality of lateral plenums with the porous media therebetween.

3. The biofilter apparatus of claim 2 further comprising a mister in fluid communication with the inlet piping for introducing humidity to the air.

4. The biofilter of claim 3, wherein said mister delivers one gallon of humidity per minute at about 800 psi.

5. The biofilter of claim 3, wherein said mister delivers two gallons of humidity per minute at about 1,500 psi.

6. The biofilter of claim 3, further comprising a condensate recirculation system, wherein water is collected in a condensate collection system, and delivered to the top of the media by sprayers.

7. The biofilter of claim 1, wherein the media has a particle size such that 95% of the media will pass through a three inch screen and be retained by a 0.5 inch screen.

8. The biofilter of claim 1, wherein the media comprises about 30–40% shredded tree bark particles, about 30–40% shredded wood, and about 30–40% composted wood.

9. The biofilter of claim 8, wherein the media further comprises additional foam particles.

10. A The biofilter of claim 1, wherein said container is about forty feet long, by eight feet wide, by eight feet, six inches tall.

11. The biofilter of claim 1, wherein said container is a standard ISO shipping container.

12. The biofilter apparatus of claim 1 further comprising at least two substantially identical containers stacked one upon another.

13. The biofilter apparatus of claim 1 further comprising up to at least six substantially identical containers stacked one upon another.

14. The biofilter apparatus of claim 1 further comprising up to at least nine substantially identical containers stacked one upon another.

15. A method for treating air via biofiltration comprising:
   providing at least one container having a height, length, and width;
   providing a porous media within the container having a select range of particle size and a depth of at least 7.5 feet;
   providing an air flow apparatus comprising:
      an inlet piping in fluid communication with a source of air to be treated;
      a supply manifold which extends the length of the container connected to the inlet piping;
      a plurality of lateral plenums situated on a floor of the container and extending widthwise within the container, said plenums being perforated to allow for the flow of air therethrough; and
      an outlet manifold spaced from a fluid communication with the plurality of lateral plenums with the porous media therebetween; and
   directing contaminated air into the container through the air flow apparatus and through the media at an airflow of at least 37.5 cfm/ft$^2$ with the select range of particle size of the porous media preventing a backpressure of more than about 10 inches of water.

16. The method of claim 15 further comprising delivering a water mist to the inlet piping for introducing humidity to the air.

17. A biofilter apparatus for air treatment, said apparatus comprising:
   an enclosed container having a height, length and width;
   a porous media within the container comprising about 30–40% shredded tree bark particles, about 30–40% shredded wood and about 30–40% composted wood, the porous media having a particle size such that 95% of the media will pass through a 3 inch screen and be retained by a 0.5 inch screen and a depth of at least 7.5 feet; and
   an air flow apparatus constructed and arranged to deliver a flow of air to be treated to the filter media to traverse the height of the filter media.

* * * * *